2,748,525
Patented June 5, 1956

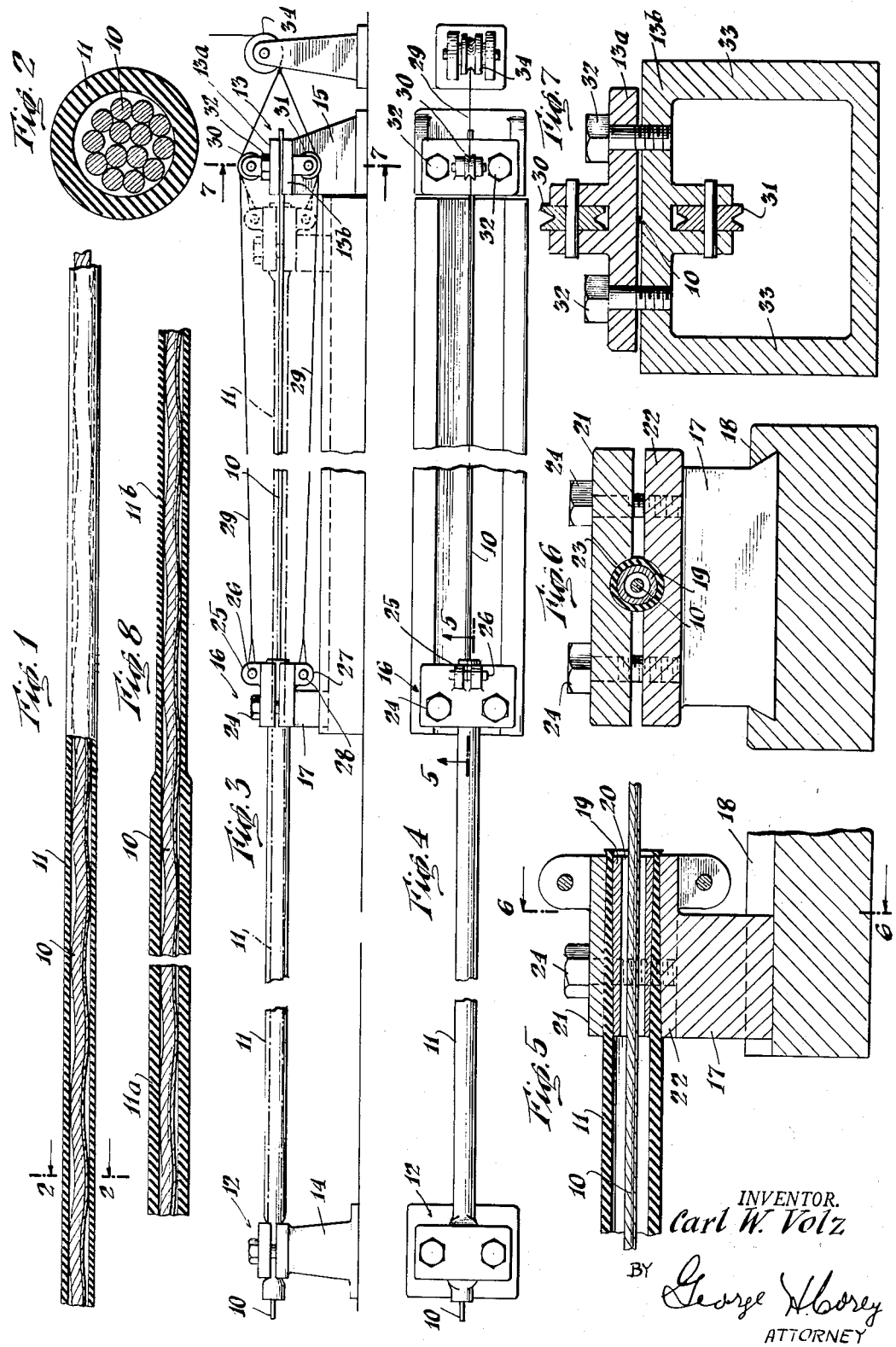

2,748,525
FLOATING FISHLINE
Carl William Volz, Scarsdale, N. Y.

Application August 1, 1951, Serial No. 239,757

7 Claims. (Cl. 43—44.98)

This invention relates to an improvement in fishlines and particularly to lines intended for use under conditions in which it is desired that the line shall tend to float on the surface of the water at the end of the cast and during reeling in or until the bait is seized by the fish.

Various proposals have been made to provide a so-called floating or buoyant fishline. For example, it has been proposed to form a braided line with a hollow center and to impregnate the surface of the line with a suitable water resistant coating. Such lines have the disadvantage that they are liable to collapse when subjected to the high tensions that may occur in fishing for various types of game fish. It has also been proposed to provide a tubular fishline from extruded tubes of synthetic materials such as nylon. Although fishlines made of such materials possess the required buoyancy they are unsatisfactory for many types of fishing because they do not possess the requisite strength to withstand the shocks imposed on the line when the game fish strikes the bait or is being played preliminary to ultimate capture.

It is one of the objects of the present invention to provide a fishline having the strength characteristics of the conventional solid braided line coupled with the buoyancy characteristics desired in a floating fishline.

It is a further object of the invention to provide a floating fishline having improved characteristics as regards its ability to stretch when subject to the sudden strains incident to the fishing of game fish; that is to say, the fishline is constructed so as to enable it better to withstand the sudden and pronounced stresses imparted at and following the instant when the bait is taken by the fish.

It is another object of my invention to provide a fishline of the "torpedo head" type that is less expensive to manufacture and which may possess the buoyancy charactertistics desired in a floating fishline.

My improved fishline in its broader aspects consists in a solid core, formed either of braided textile threads or of a single strand of a suitable textile material such as nylon, surrounded by a tubular sleeve of a pliable water resistant plastic material fitted more or less closely to the core but unattached thereto except at the ends of the line or at relatively widely spaced distances along the length thereof. By suitably controlling the inner diameter of the sleeve with relation to the outside diameter of the core, and having regard to the particular type of textile material employed in the core as respects its density and closeness of weave or braiding, it is possible to provide a sufficient air space between the sleeve and the core to impart to the line any desired buoyancy without rendering the line unduly bulky or interfering with its casting characteristics.

Because of the composite nature of the fishline and the freedom from attachment of the sleeve to the core except at the ends preferably, or optionally at widely spaced distances along the length thereof, it is made possible, by properly selecting the materials of the core and the sleeve with respect to their elasticity characteristics and relative tensile strengths and adjusting the tensions imposed on the core and the sleeve during manufacture, to produce a line having markedly improved characteristics as respects elasticity and overall tensile strength. These are factors which are of considerable importance in fishing for game fish and under similar conditions where sudden impacts or stresses are applied to the line.

The invention will be more particularly described by reference to the accompanying drawings, wherein:

Fig. 1 is a side elevation on an enlarged scale and with parts broken away of a portion of a line conforming to my invention;

Fig. 2 is a cross-section on the line 2—2 of Fig. 1;

Fig. 3 is a side elevation of one form of apparatus for holding the braided core taut and stretching a thermoplastic sleeve over the braided core in forming an embodiment of the composite fishline of the invention;

Fig. 4 is a plan view of the apparatus shown in Fig. 3;

Fig. 5 is a longitudinal section on an enlarged scale showing one form of clamping means for engaging the free end of the tubular sleeve to perform the stretching operation thereon;

Fig. 6 is a section on line 6—6 of Fig. 5; and

Fig. 7 is a section on line 7—7 of Fig. 3.

Fig. 8 is a part side elevation and part section of a portion of a line of the torpedo head type made according to the invention.

As shown in Fig. 1, the fishline is formed with a braided core 10, which may, for example, be a 9# test braided nylon line. The core is surrounded by a sleeve 11 formed of a suitable water resistant thermoplastic material, for example, a Vinylite tubing of the type used for electrical insulation purposes. As brought out in further detail in the ensuing description the outer tubing 31 has been placed under tension and drawn down about the core by stretching it to a length approximately twice that of its original form. While in this condition and held taut in the superimposed position with respect to the core, the sleeve is heated to a temperature of about 190° F. to set the sleeve material in the stretched condition.

According to the presently preferred embodiment of the method of forming the composite fishline, a length of line intended to constitute the core of the finished line is threaded through a suitable length of the selected plastic tubing and extended at one end beyond the end of the tubing a sufficient distance to allow for stretching or drawing down of the tubing in a later stage of the operation. The ends of the predetermined length of line are then secured in clamps 12 and 13 mounted on stationary supports 14 and 15 at appropriate distances apart to accommodate the length of the line in a suitably designed working space which may take the form of a rope walk. As shown in Fig. 3, one end of the tubular sleeve 11 is secured with the end of the core 10 in the pair of clamps 12. The core member 10 will have been stretched taut and put under suitable tension before its opposite end is secured in the second pair of clamps 13. The free end of the tubular sleeve 11 is then secured between the cooperating members of a special clamping device 16 mounted on a slide 17 adapted to travel in a fixed guideway 18 shown as extending along approximately half the length of the working space.

As shown in enlarged scale in Figs. 5 and 6, the clamping device 16 includes an inner tubular member 19 having a slight taper in its outer diameter to facilitate its insertion in the end of the tubular plastic sleeve 11 with the core member 10 passing through the opening 20. The member 19 cooperates with exterior clamps 21 and 22. Each of these clamps has an arcuate recess 23 adapted to engage the outer surface of the sleeve 11 and they are drawn together by set screws 24. Clamp 21 is shown as integrally formed with the slide 17, and carries on one end a pair of spaced apertured lugs 25 which receive a pin 26. Correspondingly spaced oppositely extending lugs 27 are carried on the clamp 22 for receiving a pin 28. Cables 29 are secured to the pins 26 and 28 for moving the slide 17 along the slideway during the tube drawing and stretching operation.

As shown in Figs. 3, 4 and 7 the cables are trained over guide pulleys 30 and 31 respectively mounted on the clamp members 13a and 13b of the set of clamps 13 by means of which one end of the core 10 is held during the tube drawing operation. The clamp member 13a is shown as secured to and drawn down against clamp 13b by means of set screws 32. The lower clamp 13b is shown as an integral part of the stationary clamp support 15, and the latter is provided with spaced legs 33 to furnish clearance for the lower cable 29. The two cables 29 after passing over the pulleys 30 and 31 are passed over the pulley 34 to a winding drum or similar device, not shown, for applying tension to the tubular sleeve.

As indicated in dotted line in Fig. 3, the diameter of the tubular sleeve 11 is reduced as a consequence of the drawing or stretching operation. The extent of the reduction of the diameter of the sleeve may be regulated as desired, depending on the characteristics of the plastic material employed, to provide a predetermined amount of air space between the core and the inner walls of the sleeve and consequently any desired buoyancy for the composite fishline.

After the tubular sleeve has been stretched and reduced in diameter to the desired degree and while it still continues to be held under tension, heat is applied to anneal or relax the stretched plastic material so that the tube will have no tendency to return to its original length upon releasing the core and its tubular covering from their taut positions. The tubular sleeve is secured in any suitable manner to the core at the stationary end of such sleeve either at the time the core is threaded through the tube preliminary to the stretching or drawing operation or after conclusion thereof. The opposite end of the sleeve 11 is secured to the adjacent end of the core either at conclusion of the stretching operation or after the heat treatment as desired.

Advantageously the tension on the core 10 is relaxed entirely or to some predetermined extent before the tubular sleeve is secured to the core at the free end of the sleeve, i. e., the end that travels along the core during the stretching operation. By relaxing the tension on the core entirely or suitably controlling the tension that remains imposed on the core after the conclusion of the stretching operation, it is made possible to balance the elasticities of the core and the tubular covering or sleeve so that when the fishline is being used and a sharp pull is applied to the line the action is one whereby the tubular sleeve first takes the greater part of the stress, but being more elastic is capable of being stretched to a relatively great extent before reaching the breaking point. At the same time as the tubular sleeve is stretched tension is imposed on the core but this tension is more gradual than would be the case if the tubular sleeve were not present. It will be seen that by judiciously controlling the relative strengths and elasticities of the core and the sleeve it is possible to utilize the strengths of the two components and to utilize their combined elasticities to provide a line that will take up sudden stresses more effectively and at the same time utilize in an additive fashion the tensile strengths of the two materials making up the two components.

The invention is also applicable in the manufacture of lines that are tapered from one end to the other or are otherwise varying in their cross-section, as for example, the so-called "torpedo head" fishline. According to one method of producing a composite fishline having a varying external diameter similar to that of the conventional tapered lines the larger end of the core is secured in fixed clamps (12 in the drawing) with the smaller diameter section of the line engaged in the fixed clamps 13. The core will conform as to taper or varying section to the conventional fishlines of the particular type that is to be produced, and may actually consist of such a line except for omission of the customary coating or varnishing operations thereon. The plastic tubing will be appropriately selected as to external diameter so as to be initially somewhat larger than the largest section of the core. When the tubing has been stretched to bring the diameter down to the desired extent with respect to its relation to the section of the core that is of larger diameter, an additional pair of clamps may be applied at an appropriate point in the length of the line where the core is of intermediate diameter. This will arrest further thinning and drawing down of the wall thickness and the outer diameter of the tubing in the portion thereof that encloses the thicker section of the core. Thereafter the drawing down operation may be resumed with consequent thinning of the remaining portion of the tubing until it has been brought to the desired diameter and wall thickness with respect to the smaller diameter portion of the core. If desired, the drawing down may be conducted in more than two steps by introducing additional clamps progressively along the length of the core as the tubing is gradually thinned down in the drawing or stretching operation.

According to another method, and one that is particularly suitable in producing an improved fishline of the torpedo head type, a braided core of the same diameter throughout is used. A length of line constituting the core is threaded through a plastic tubing of appropriate diameter and the two are clamped together in a fixed clamp such as 12 at a distance from one end of the composite line thus formed appropriate to leave a free, unstretched portion of a length corresponding to that of the desired torpedo head. The opposite ends of the core and the tubing are then secured each to separate clamping devices as previously described so that the tubing may be stretched relative to the core while the latter is held under a suitable degree of tension. The tubing is then stretched in that portion of the length thereof between the fixed clamp 12 and the movable clamp 16 until it has been thinned and its diameter reduced to the desired degree. It is then set in the stretched condition by heating as earlier described. When the ends of the tubing and the core have been finally secured together, the resulting composite line will have a portion of somewhat larger external diameter adjacent one end and will also be weighted in that portion as compared to the rest of the line due to the greater wall thickness of the tubing in the torpedo head portion.

If desired, instead of leaving a predetermined portion of the composite line free from all tension during the tubing stretching and thinning operation the two ends of the core and the tubing may be secured in the fixed clamps 12 and 13 after placing the core in suitable tension and having previously threaded the core through an appropriate length of tubing. Then, either after partially thinning the tubing throughout its length or merely drawing the tubing to an appropriate degree of tautness short of pronounced thinning, a second clamp may be applied at a point intermediate the position of the fixed clamp 12 and the position of the movable clamp 16 selected to define the desired length of the torpedo head between the added clamp and the fixed clamp 12. Thereupon the thinning of the remainder of the tubing and its drawing down over the core may be continued until a desired degree of thinness of the tubing walls in that section and a desired overall buoyancy of the line has been insured. Thereafter, the thinned tubing will be set in the stretched condition by heating as previously described. If it is desired that the torpedo head shall have more or less taper from the head toward the main portion of the line, additional clamps may be applied to the line after successive intervals of stretching of the tubing designed to produce thinner wall sections along the line from the casting end thereof.

A section of a line of the torpedo head type made according to my invention is shown in Fig. 8, wherein a core 10 of uniform cross-section is disposed within a plastic tubing having a greater wall thickness at the casting end, as indicated at 11a, in comparison with the wall thickness more remote therefrom, as indicated at 11b.

As indicated previously a thermoplastic material such as the conventional Vinylite tubing used for certain electrical insulation purposes is a very suitable material for the outside sleeve of my composite fishline. It will be understood, however, that there are many other forms of synthetic plastics and certain naturally occurring plastics, such as rubber when suitably vulcanized, that may be utilized in a similar manner, and my invention is not to be deemed to be limited to any particular selection of plastic tubing within the broad class of plastics that may be deformed by stretching and which may be annealed or set by a heat treatment so as to relieve the tensions and tendency to return to the original linear dimension. Other plastics that may be mentioned are nylon in tubular form, various vinyl ester resins other than the Vinylite resin referred to above, and notably the vinylidene chloride resins. The polyethylenes and acrylic resins that are extrudable into tubular forms are also useful as the tubular sleeve element of my improved fishline.

It will also be understood that the core material may be any suitable textile material such for example as silk, cotton or linen in suitably braided form. Likewise, a single filament line of nylon, polyethylene or another suitable plastic may be employed as the core material.

It will be understood that the heat treatment required to relax and relieve the tension on the stretched tubing will vary depending upon the particular plastic material employed.

I claim:

1. A composite fishing line comprising a core of a predetermined diameter, said core being a fishing line, and a covering for said core of flexible elastically stretchable water impervious material and of tube form having an internal diameter slightly greater than the diameter of the core, said tube being coextensive in length with the length of said line and secured to said line at the ends thereof, said tube also having its internal surface in non-adhering relation to the outer surface of the line throughout substantially its entire length to provide an air space between said surfaces and permit relative longitudinal movement between the core and covering, said core in the unstretched condition of said tubular covering extending along the length of said tube at all points in the length of said core and being normally in relaxed condition as to tension to provide for elastically stretching said tube upon initial application of tensile stress to said composite line, said core thereupon becoming stressed, said core and tube in the stretched condition of said tube jointly taking the tensile stress applied to said composite line.

2. A fishing line as claimed in claim 1 wherein the stretchable covering for said core consists of a thermoplastic resin.

3. A fishing line as claimed in claim 1, wherein the core consists of a braided filamentary material and the covering therefor consists of a vinyl resin.

4. A fishing line as claimed in claim 1 wherein said core is a braided fish line having an enlarged section adjacent one end thereof and said covering therefor has a generally correspondingly varying cross-section.

5. A fishing line as claimed in claim 1 wherein said core is a fishing line having a substantially uniform diameter throughout the length thereof and said covering therefor is of substantially larger external diameter and of thicker wall section adjacent one end of said line than adjacent the opposite end thereof.

6. A composite floatable fishing line comprising an elastically stretchable filamentary core, and a water-resistant, elastically stretchable, tubular sleeve for said core, said core being enclosed within and extending lengthwise of said sleeve throughout the length of said line and having its outer surface in unattached relation to the internal surface of said tubular sleeve throughout substantially its entire length, said sleeve, when not under endwise tension having an internal diameter slightly greater than the diameter of said core to provide an air space between said core and said sleeve, said core in the unstretched condition of said sleeve extending along the length of said sleeve at all points in the length of said core and being in a normally relaxed condition as to tension to provide for elastically stretching said sleeve upon initial application of tensile stress to said composite line, said core thereupon becoming stressed, said core and sleeve in the stretched condition of said sleeve jointly taking the tensile stress applied to said composite line.

7. A composite floatable fishing line comprising a braided filamentary core, and a continuous water impervious elastically stretchable sleeve enclosing said core throughout its length, said sleeve being attached to said core at the ends thereof and free from extended attachment to said core at intermediate points along the length thereof, said sleeve having an internal cross section slightly greater than the cross section of said core to form an air space within said sheath contributing buoyancy to the line and to permit relative longitudinal movement between said core and said sleeve upon stretching of said sleeve when the line is subjected to tensile stress, said core in the unstretched condition of said sleeve extending along the length of said sleeve at all points in the length of said core and being in a normally relaxed condition as to tension to provide for elastically stretching said sleeve upon initial application of tensile stress to said composite line, said core thereupon becoming stressed, said core and sleeve in the stretched condition of said sleeve jointly taking the tensile stress applied to said composite line.

References Cited in the file of this patent

UNITED STATES PATENTS

| Number | Name | Date |
|---|---|---|
| 396,130 | Willoughby | Jan. 15, 1889 |
| 1,296,057 | Ellsworth | Mar. 4, 1919 |
| 1,371,067 | Bird | Mar. 8, 1921 |
| 1,842,169 | Heddon | Jan. 19, 1932 |
| 2,215,760 | Ledrich | Sept. 24, 1940 |
| 2,250,832 | Hedge | July 29, 1941 |
| 2,274,255 | Pierce | Feb. 24, 1942 |
| 2,467,642 | Wilson et al. | Apr. 19, 1949 |
| 2,479,919 | Flood | Aug. 23, 1949 |
| 2,536,312 | Saether | Jan. 2, 1951 |

FOREIGN PATENTS

| Number | Country | Date |
|---|---|---|
| 99,805 | Sweden | July 11, 1940 |